US012761884B2

(12) United States Patent
Kammakomati et al.

(10) Patent No.: US 12,761,884 B2
(45) Date of Patent: Oct. 13, 2026

(54) PLAYBOOK GENERATION USING CONTROLLED CAUSAL LANGUAGE MODELING

(71) Applicant: International Business Machines Corporation, Armonk, NY (US)

(72) Inventors: Mehant Kammakomati, Hyderabad (IN); Prince Kumar, Mohiuddin Nagar (IN); Ashok Pon Kumar Sree Prakash, Bangalore (IN); Srikanth Govindaraj Tamilselvam, Chennai (IN); Padmanabha Venkatagiri Seshadri, Mysore (IN)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 18/514,472

(22) Filed: Nov. 20, 2023

(65) Prior Publication Data

US 2025/0165230 A1 May 22, 2025

(51) Int. Cl.

| | |
|---|---|
| ***G06F 8/35*** | (2018.01) |
| ***G06F 40/205*** | (2020.01) |
| ***G06F 40/30*** | (2020.01) |
| ***G06F 40/40*** | (2020.01) |
| ***G06N 3/08*** | (2023.01) |
| ***G06N 20/00*** | (2019.01) |

(52) U.S. Cl.

CPC .............. *G06F 8/35* (2013.01); *G06F 40/205* (2020.01); *G06F 40/30* (2020.01); *G06F 40/40* (2020.01); *G06N 3/08* (2013.01); *G06N 20/00* (2019.01)

(58) Field of Classification Search

CPC . G06F 8/35; G06F 8/427; G06F 40/20; G06F 40/205; G06F 40/30; G06F 40/40; G06F 40/284; G06F 16/3329; G06F 16/3344; G06N 20/00; G06N 3/08

See application file for complete search history.

(56) References Cited

U.S. PATENT DOCUMENTS

| | | | | |
|---|---|---|---|---|
| 11,144,314 | B2 | 10/2021 | Baldassarre et al. | |
| 12,141,134 | B1 * | 11/2024 | Powar | G06F 16/2433 |
| 2020/0387357 | A1 | 12/2020 | Mathon et al. | |
| 2023/0177261 | A1 | 6/2023 | Clement et al. | |
| 2025/0069595 | A1 * | 2/2025 | Vuskovic | G06F 40/35 |

OTHER PUBLICATIONS

Thopalle, Praveen Kumar, Enhancing Ansible Playbooks with Large Language Models: Revolutionizing Automation, Journal of Artificial Intelligence & Cloud Computing, May 2022, 4 pages, [retrieved on Nov. 20, 2025], Retrieved from the Internet: <URL:https://srcpublishers.com/index.php/ai-cloud-computing/article/view/94>.*

(Continued)

*Primary Examiner* — Geoffrey R St Leger

(74) *Attorney, Agent, or Firm* — CHIP LAW GROUP

(57) ABSTRACT

Methods and systems for generating a playbook include parsing a prompt and playbook context to identify modules. Names of identified modules are added to the prompt to create a modified prompt. A document relevant to the playbook context and the modified prompt is identified based on a semantic search. A schema is determined based on the document. An automatic completion of the prompt is generated in accordance with the schema using a trained model.

20 Claims, 10 Drawing Sheets

(56) References Cited

OTHER PUBLICATIONS

Pujar et al., "Automated Code generation for Information Technology Tasks in YAML through Large Language Models", arXiv:2305.02783v4 [cs.SE] May 23, 2023, pp. 1-9.
Nijkamp et al., "Codegen: an Open Large Language Model for Code With Multi-Turn Program Synthesis", arXiv:2203.13474v5 [cs.LG] Feb. 27, 2023, pp. 1-25.
Donahue et al., "Enabling Language Models to Fill in the Blanks", arXiv:2005.05339v2 [cs.CL] Sep. 10, 2020, pp. 1-10.
Chen et al., "Evaluating Large Language Models Trained on Code", arXiv:2107.03374v2 [cs.LG] Jul. 14, 2021, pp. 1-35.
Khandelwal et al., "Generalization Through Memorization: Nearest Neighbor Language Models", arXiv preprint arXiv:1911.00172. Nov. 2019, pp. 1-13.
Borgeaud et al., "Improving Language Models by Retrieving from Trillions of Tokens", In International conference on machine learning Jun. 28, 2022, pp. 1-35.
Fried et al., "Incoder: a Generative Model for Code Infilling and Synthesis", arXiv:2204.05999v3 [ cs.SE] Apr. 9, 2023, pp. 1-26.
"Ansible Playbook Generator", https://syshunt.com/ansible-playbook-generator/, Retrieved on Aug. 28, 2023, pp. 1-7.
Ottens et al., "Automatic Code Generation using Pre-Trained Language Models", arXiv preprint arXiv:2102.10535. Feb. 21, 2021, pp. 1-11.
"AWS CodeWhisperer creates computer code from natural language", https://www.amazon.science/latest-news/aws-codewhisperer-creates-computer-code-from-natural-language, Retrieved Aug. 28, 2023, pp. 1-10.
Nashid et al., "Retrieval-Based Prompt Selection for Code-Related Few-Shot Learning", InProceedings of the 45th International Conference on Software Engineering (ICSE'23) 2023, May 2023, pp. 1-13.
Authors et al., Disclosed Anonymously, "System and Method for Programming with Natural Language Using an Integrated Development Environment", IPCOM000266280D, Jun. 9, 2021, pp. 1-9.
Li et al., "A Survey on Retrieval-Augmented Text Generation", arXiv:2202.01110v2 [cs.CL] Feb. 13, 2022, pp. 1-13.
Lewis et al., "Retrieval-Augmented Generation for Knowledge-Intensive NLP Tasks", arXiv:2005.11401v4 [cs.CL] Apr. 12, 2021, pp. 1-19.
Allal et al., "Santacoder: Don't Reach for the Stars!", arXiv:2301.03988v2 [cs.SE] Feb. 24, 2023, pp. 1-22.
Zhong et al., "Training Language Models with Memory Augmentation", arXiv:2205.12674v3 [cs.CL] Nov. 29, 2022, pp. 1-17.
No Author, "Losses", https://web.archive.org/web/20230923095332/https://www.sbert.net/docs/package_reference/losses.html, Sep. 23, 2023, 13 pages.
No Author, "Masked language modeling", https://web.archive.org/web/20230702210548/https://huggingface.co/docs/transformers/main/tasks/masked_language_modeling, Jul. 2, 2023, 13 pages.
No Author, "Red Hat Ansible Lightspeed with IBM watsonx Code Assistant", https://web.archive.org/web/20231027054353/https://www.redhat.com/en/technologies/management/ansible/ansible-lightspeed, Oct. 27, 2023, 3 pages.
No Author, "Semantic Search", https://web.archive.org/web/20230923091344/https:/www.sbert.net/examples/applications/semantic-search/README.html,Sep. 23, 2023, 7 pages.

* cited by examiner

400

```
- name: Test Kubernetes
  hosts: webservers
  remote_user: root
  tasks:
  - name: Create a k8 namespace
    k8s:
      name: testing
      api_version: v1
      kind: Namespace
      state: present

  - name: Change file ownership, group
    ansible.builtin.file:
      path: /etc/foo.conf

  - name: Create service object
    k8s:
      state: present
      definition:
        apiVersion: v1
        kind: Service
        metadata:
          name: web
          namespace: testing
          labels:
            app: galaxy
            service: web
        spec:
          selector:
            app: galaxy
            service: web
```

```
  - name: Create configmap using server side apply
```

410

FIG. 4

PLAYBOOK GENERATION USING CONTROLLED CAUSAL LANGUAGE MODELING

BACKGROUND

The present invention generally relates to code generation and, more particularly, to generation of infrastructure orchestration playbooks.

ANSIBLE® is an infrastructure orchestration automation tool that uses a playbook to declare infrastructure features. In this manner, the tool helps to manage devices in an inventory of devices that may be dynamically selected for a task. The playbook may be stored as a text file that is written in any appropriate format, such as YAML.

Writing a playbook for a given deployment is a time-consuming process, particularly in instances where portions of the playbook are repetitive from one deployment to another and instances where modules are employed that an engineer may be unfamiliar with. While automatic code generation is available in some contexts, code generation models may need frequent updates to respond to changes in modules from one version to the next and the release of new modules. This makes existing automatic code generation models inadequate for playbook generation.

SUMMARY

A method for generating a playbook includes parsing a prompt and playbook context to identify modules. Names of identified modules are added to the prompt to create a modified prompt. A document relevant to the playbook context and the modified prompt is identified based on a semantic search. A schema is determined based on the document. An automatic completion of the prompt is generated in accordance with the schema using a trained model.

A system for generating a playbook includes a hardware processor and a memory that stores a computer program. When executed by the hardware processor, the computer program causes the hardware processor to parse a prompt and playbook context to identify modules, to add names of identified modules to the prompt to create a modified prompt, to identify a document relevant to the playbook context and the modified prompt based on a semantic search, to determine a schema based on the document, and to generate an automatic completion of the prompt in accordance with the schema using a trained model.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 4 is a diagram illustrating a context and a prompt used as an input for playbook autocompletion, in accordance with an embodiment of the invention;

DETAILED DESCRIPTION

Figure 1:
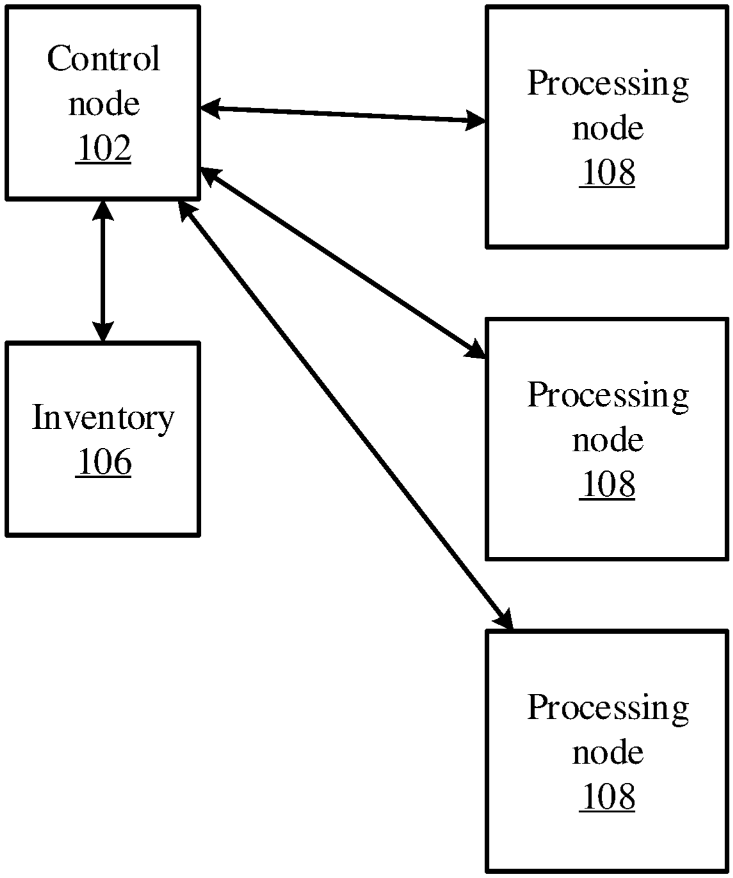
FIG. 1 is a block diagram of a distributed computing system that may deploy instructions using a playbook, in accordance with an embodiment of the present invention.

Applying code generation models to ANSIBLE® playbooks faces a number of challenges. For one, the use of pre-trained models makes it difficult to follow changes to the resources that ANSIBLE® provides, such as new modules, roles, or plugins. These resources may not exist in the training data for a pre-trained model, and there may not be enough samples to prepare new training data to retrain the model. Further, keeping language models in sync with incremental updates to existing resources is not viable, nor is having a suite of language models that support specific versions. Hallucination is also a common problem for these models, which can cause errors in the output playbook, leading to failure of the indicated systems.

To address these challenges and others, a language model may use ANSIBLE® documentation to generate appropriate resources through retrieval. This ensures that the model can easily adapt to new resources and incremental updates. Additionally, preferences may be embedded on the fly during generation. Furthermore, the playbook may include schemas and custom logit processors to perform controlled generation of the playbook, which can provide playbook generation that is compliant with the schema and can reduce the hallucination error surface.

In some embodiments, a method for generating a playbook includes parsing a prompt and playbook context to identify modules. Names of identified modules are added to the prompt to create a modified prompt. A document relevant to the playbook context and the modified prompt is identified based on a semantic search. A schema is determined based on the document. An automatic completion of the prompt is generated in accordance with the schema using a trained model. By incorporating documentary information, the automatic completion of the prompt can be used to complete a playbook using up-to-date information about modules that are to be used.

In some embodiments, identifying the document includes searching a set of documentation for the modules. The documentation is used to guide the automatic completion of the prompt in a manner that accurately reflects the particular specifications of the module.

In some embodiments, the document defines the schema to include a format for using a respective module in a playbook. The documentation may provide specific formatting and syntax information that guides the generation of the automatic completion.

In some embodiments, generating the automatic completion is further performed in accordance with a constraint. The use of constraints provides additional guidance for the automatic completion.

In some embodiments, the constraint is selected from the group consisting of a default constraint, a constraint of a value corresponding to a set, a constraint of a value to a particular type, and a required field. These constraints give specific information that controls the automatic completion.

In some embodiments, the context includes a partially defined playbook and the prompt includes a description of a function to be implemented by the automatic completion. The context having a partially defined playbook helps to guide the automatic completion by providing correlations that may be used to inform which modules should be used in the automatic completion.

In some embodiments, identifying the document is performed using an encoder-only transformer-based neural network model. The model provides natural language processing to identify documentation that is relevant to a query.

In some embodiments, the encoder-only transformer-based neural network model is trained on a dataset made up of triplets that each include a query, a positive passage, and a negative passage using a multiple negative ranking loss function. The loss helps the model learn the difference between positive passages that are appropriate to the query and negative passages that appear similar, but that are not appropriate.

In some embodiments, generating the automatic completion is performed using a decoder-only neural network model for causal language modeling. The decoder-only neural network model provides code generation to complete the prompt.

In some embodiments, the decoder-only model is trained on a dataset made up of pairs that each include a module name and a combination of a prompt and a context. The dataset creates associations between prompts and correct module names to be used in the automatic completion.

Referring now to FIG. 1, a cloud computing system is shown. A control node 102 interacts with a number of processing nodes 108, each of which represents a separate logical or physical processing system. An inventory 106 includes a list of processing nodes 108 that are managed by the control node 102, which may be used to describe deployments.

In some embodiments, ANSIBLE® may be used on the control node 102 to manage a container orchestration system, such as Kubernetes. In such embodiments, the playbook may make use of a Kubernetes module to implement container orchestration, including deployment and configuration of containers on the processing nodes 108. The control node 102 may make use of a variety of ANSIBLE® modules, each of which may represent program code that may run on one or more processing nodes 108. The playbook may be a text file on the control node 102 that indicates how the modules, plugins, and roles may be used, and may be defined in a YAML format.

Figure 2:
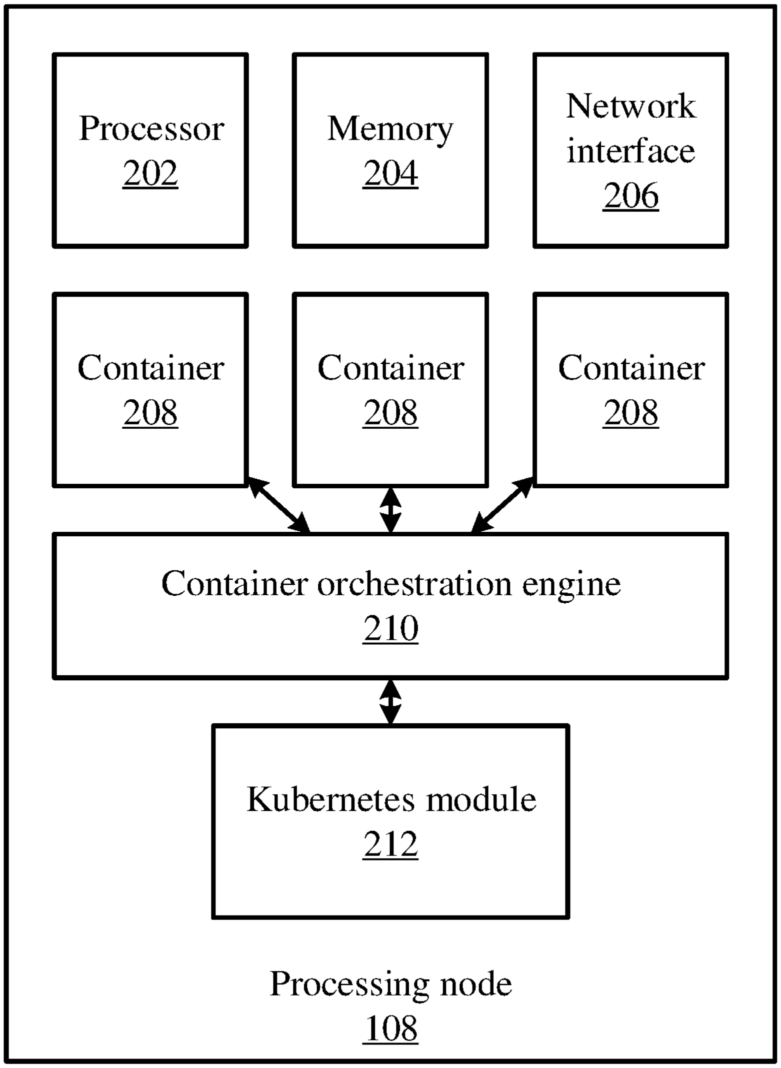
FIG. 2 is a block diagram of a processing node in a distributed computing system that may receive deployment instructions using a playbook, in accordance with an embodiment of the present invention.

Referring now to FIG. 2, additional detail on a processing node 108 is shown. The processing node 108 includes a hardware processor 202, a memory 204, and a network interface 206. The network interface 206 is configured to communicate with the control node 102 and with other processing nodes 108 as needed, using any appropriate wired or wireless communications medium and protocol. The processing node 108 also includes one or more functional modules that may, in some embodiments, be implemented as software that is stored in the memory 204 and that is executed by the hardware processor 202. In other embodiments, one or more of the functional modules may be implemented as one or more discrete hardware components in the form of, e.g., application-specific integrated chips or field programmable gate arrays.

The processing node 108 includes one or more containers 208. It is specifically contemplated that each container 208 represents a distinct operating environment. The containers 208 each include a set of software applications, configuration files, workload datasets, and any other information or software needed to execute a specific workload. The containers 208 are stored in memory 204 and are instantiated and decommissioned by the container orchestration engine 210 as needed. It should be understood that, as a general matter, an operating system of the processing node 108 exists outside the containers 208. Thus, each container 208 interfaces with the same operating system kernel, reducing the overhead needed to execute multiple containers simultaneously. The containers 208 meanwhile generally have no communication with one another outside of specifically agreed-to interfaces, reducing security concerns.

The container orchestration engine 210 may be implemented or managed by a Kubernetes module 212, which in turn may have been deployed and configured by the control node 102. In addition to the Kubernetes module 212, a number of other modules may be deployed by the control node 102 in accordance with a playbook.

Figure 3:
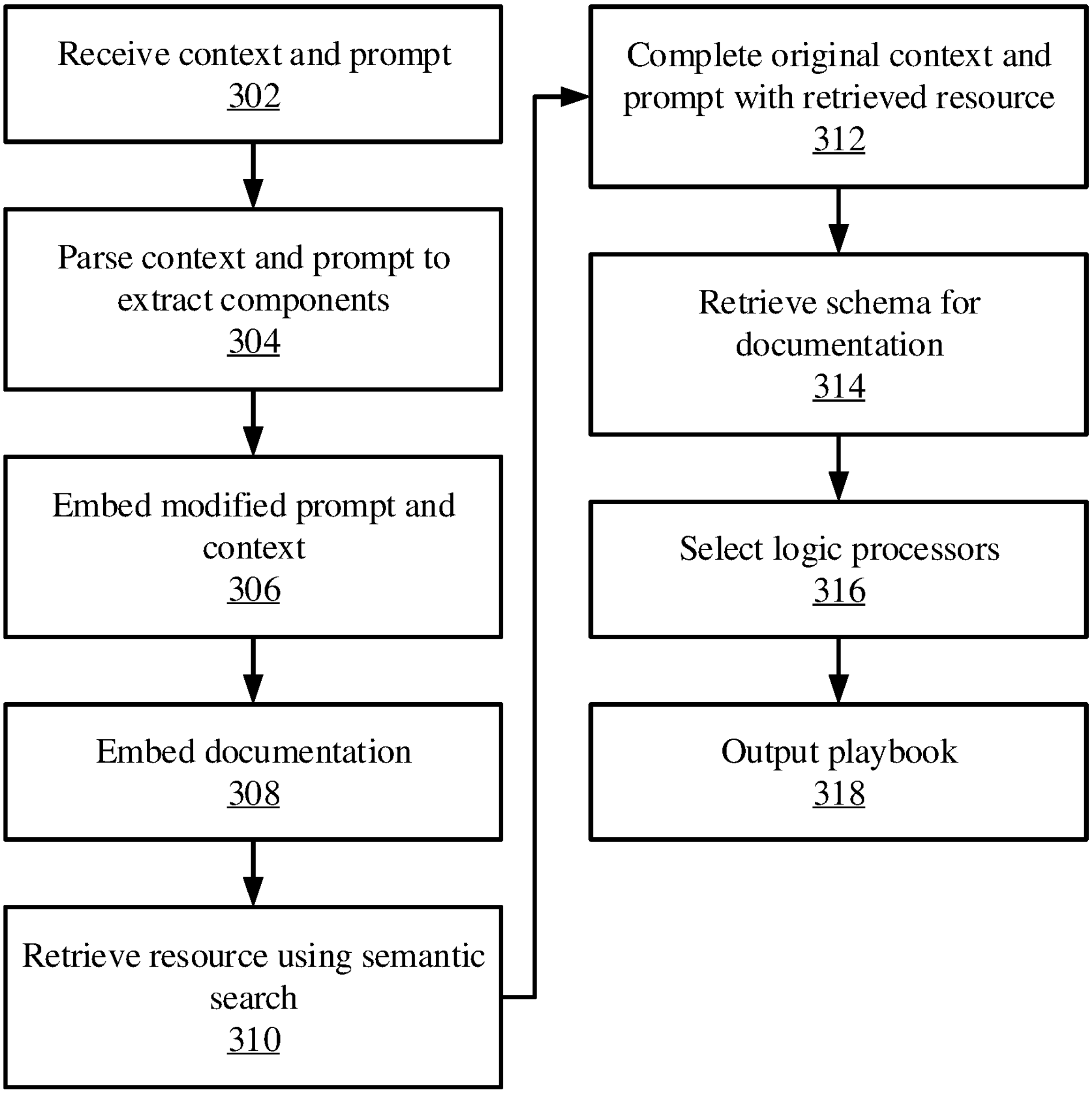
FIG. 3 is a block/flow diagram of a method for automatically completing a playbook responsive to a prompt, in accordance with an embodiment of the present invention.

Referring now to FIG. 3, a method for generating a playbook using a machine learning model. Block 302 receives context and a prompt from a user. For example, the user may write some part of the playbook manually, which may be treated as the context. The prompt may include a particular task that is sought. In some cases the context may be empty, such that only a prompt is received.

Block 304 parses the context and the prompt to extract components that contribute to correlation and causation with documentation. For example, the context and prompt may be written in YAML and may include components that relate to a particular ANSIBLE® resource, such as a module, plugin, or role. Packages and components that co-occur in the text may be seen as correlated, providing information about associations between the packages.

Block 306 embeds the modified context and prompt using any appropriate language embedding model. Block 308 similarly determines an embedding for documentation relating to a particular version of ANSIBLE® that is to be executed. Embedding of the documentation may be performed over all module, plugin, and role documents for the version. The embeddings may be generated using an encoder-only model, such as a bidirectional encoder representations from transformers (BERT) model, which may be trained in a Siamese network for retrieval task where a relevant document is retrieved from a document corpus.

Block 310 retrieves documentation using a semantic search. The search query may be based on the embedded context and prompt, finding similarity to document embeddings using any appropriate distance metric to identify relevant documents. For example, cosine similarity may be used to determine documents that are relevant to the modified context and prompt, and a top k matching documents may be selected. Block 312 then completes the original context and prompt with the name of the retrieved resource.

The names of modules may be converted to a corresponding namespace.collection format and may be added to the prompt.

The semantic search may make use of explicit or inferred bias through usage statistics on a similar set of resources. Thus, for a given enterprise, usage may be tracked across different playbooks and statistics may be generated that characterize how often the different resources are used and which resources are used together. In another use case, a human may intervene to select applicable resources.

Once the most relevant resource is identified, a corresponding schema or syntax can be identified and retrieved in block 314. The schema or syntax may be defined by the developers of the resource along with its usage and documentation. Thus, the identified documentation may define a format for using a respective module in a playbook. Block 316 selects a set of logit processors for respective fields in the schema to control the output of a language model, based on the constraints defined in the schema/syntax. A set of intended tokens and custom stopping criteria may also be used. A logit processor may be a user-defined module that can be introduced into model inferencing, for example to inspect tokens and express custom stopping criteria for model generation.

Using these constraints, the playbook may be completed by adding to the context using a language model to generate text according to the prompt and the constraints. The constraints may include a default constraint, a constraint chosen from a finite set, a value-type constraint, and/or a set of required fields.

The constraints may take a number of different forms. For example, a constraint may enforce a value having a Boolean type. In another example, where the output is constrained to be a number, a logit processor may modify the logits on every forward pass until an appropriate token is received. In another example, the value may be constrained to a set of values or choices. For such a constraint, forward passes may be used and logits may be normalized to compute joint probabilities for each choice. A choice with a highest joint probability or a default value may be selected, depending on whether the joint probabilities are above or below a threshold value. Required fields may be enforced by explicitly including the required field while inferencing a corresponding value. If the value is not as intended, then a default value may be used. For optional fields, the model may continue to autoregressively generate the rest of the tokens with enforced constraints.

Referring now to FIG. 4, an exemplary combination of the context 400 and prompt 410 is shown. The context 400 includes a partial playbook definition, including whatever elements of the playbook that the user cares to input by hand. The prompt 410 includes, in this case, a description of the function that is to be implemented. This prompt 410 and the context 400 are used as input to a language model that is trained on ANSIBLE® playbooks to generate additional the rest of the playbook, filling out the prompt 410 with appropriate values in accordance with an identified resource and a corresponding schema or syntax. The prompt 410 may include a natural language description of the function to be implemented.

Figure 5:
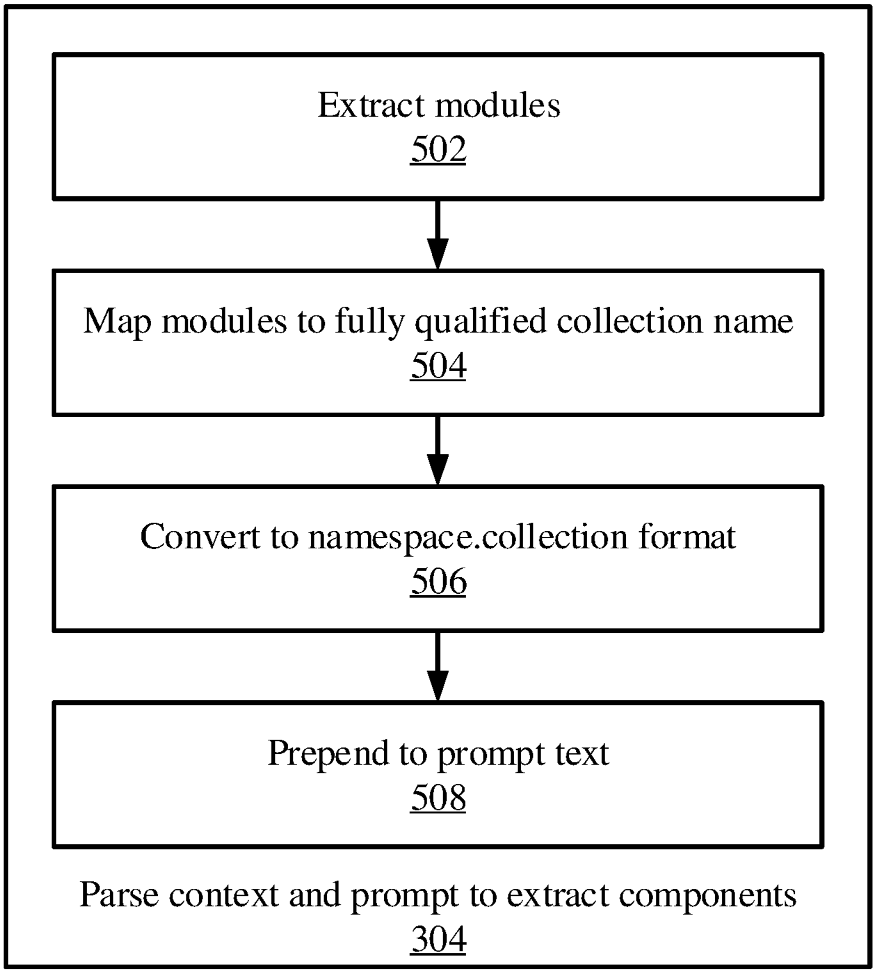
FIG. 5 is a block/flow diagram of a method for parsing the context and prompt to extract component names, in accordance with an embodiment of the present invention.

Referring now to FIG. 5, additional detail is given for the parsing of block 304. Block 502 may extract modules from the context 400. For example, the context 400 may be tokenized and the syntax of the playbook YAML format may be used to identify module names. In the example of FIG. 4, for example, a module may be "k8s", referring to a Kubernetes module. If the module does not follow a fully qualified collection name, then block 504 may map the module to a fully qualified collection name or to a designated collection that is frequently employed by developers.

Block 506 then converts the extracted modules to their corresponding namespace.collection format. The converted module names may then be prepended, along with the name of the playbook, to the prompt text 410. The ordering of the modules helps in document retrieval ranking and selection.

Specific use cases can be handled on the fly. For example, a whitelisted set of resources may be used in generation to help enhance security. This allows an enterprise to control the set of modules that can be generated to only approved modules, so that modules that have vulnerabilities or an intellectual property conflict may be excluded. In another example, new, updated, or version-specific resources may be defined by the enterprise to be used in the generation of the playbook.

Figure 6:
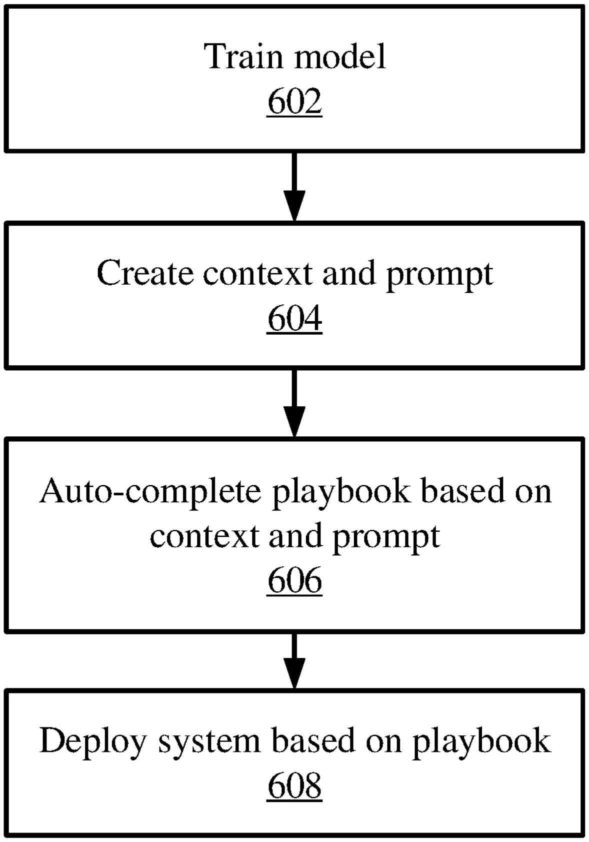
FIG. 6 is a block/flow diagram of a method of training and using a model to autocomplete a playbook and to deploy a system based on the playbook, in accordance with an embodiment of the present invention.

Referring now to FIG. 6, a method for creating and using a playbook is shown. Block 602 trains the playbook generation model, as will be described in greater detail below. The model may be transformer-based, using neural networks to predict the answer to the prompt based on the context, the prompt, and any additional information that may be gleaned from relevant documentation.

After training, a user may create a context and prompt, for example writing part of the playbook manually for the context and identifying at least one part that is incomplete for the prompt. In some cases, the context may be empty and the prompt may be used alone. The playbook may then be auto-completed using the trained model in block 606. Once the playbook is complete, it may be used to deploy a system in block 608.

Figure 7:
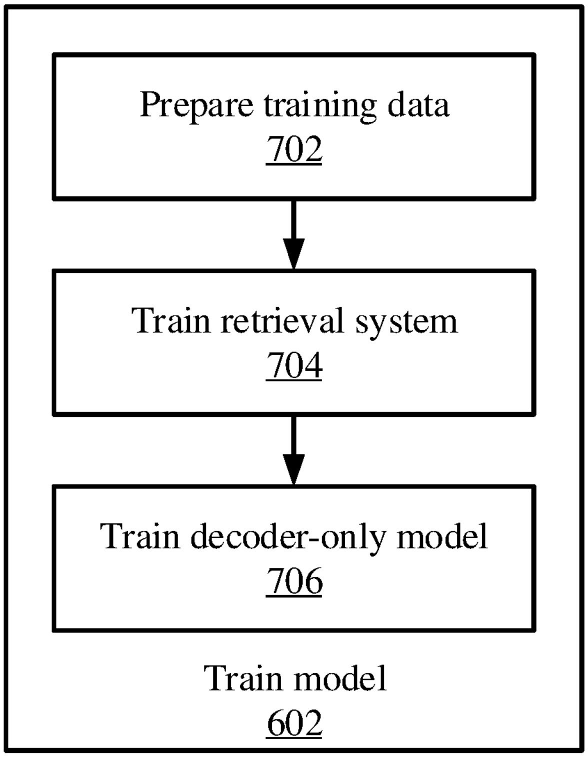
FIG. 7 is a block/flow diagram of a method of training a model to perform playbook autocompletion, in accordance with an embodiment of the present invention.

Referring now to FIG. 7, additional detail on training the model 602 is shown. The model may include two parts: a retrieval system for identifying relevant documentation and a decoder-only model that completes the playbook based on a user's input prompt. Block 702 begins by preparing training data for each model. For the retrieval system, the training data may include triplets that have a query, a matching passage, and a non-matching passage. The query may be prepared as described above with respect to the parsing of the context and prompt in block 304. The matching passage may similarly be selected as a corresponding document as in block 310. A non-matching passage may be selected so that it is similar to the matching passage but is not suitable for the query.

The selection of the non-matching passage may be performed by choosing a document from the same collection as the matching passage, or may be selected according to a module name that is similar to a module from the corpus. As an example of the latter case, a negative sample for ansible-.builtin.template may be community.general.one_template. The longest common substring on the non-fully qualified collection names may be used to identify the non-matching sample.

The training data for the decoder-only model may include a prompt and context as a first term and a corresponding resource and properties as a second term. The second term may be parsed from an existing dataset such that all required fields are listed first in ascending order, and then optional fields are populated from the training dataset.

The retrieval system may be trained 704 using a supervised training process based on the prepared training data. Updating the parameters of the retrieval model may be performed in accordance with minimizing a multiple negative ranking loss. This loss function helps the model learn clear differences between the matching passages and the similar negative passages. The decode-only model may be trained 706 using causal language modeling with a cross-entropy loss function.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 800 contains an example of an environment for the execution of at least some of the computer code involved in performing the inventive methods, such as automatic playbook completion 819. In addition to block 819, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 819, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible.

Figure 8:
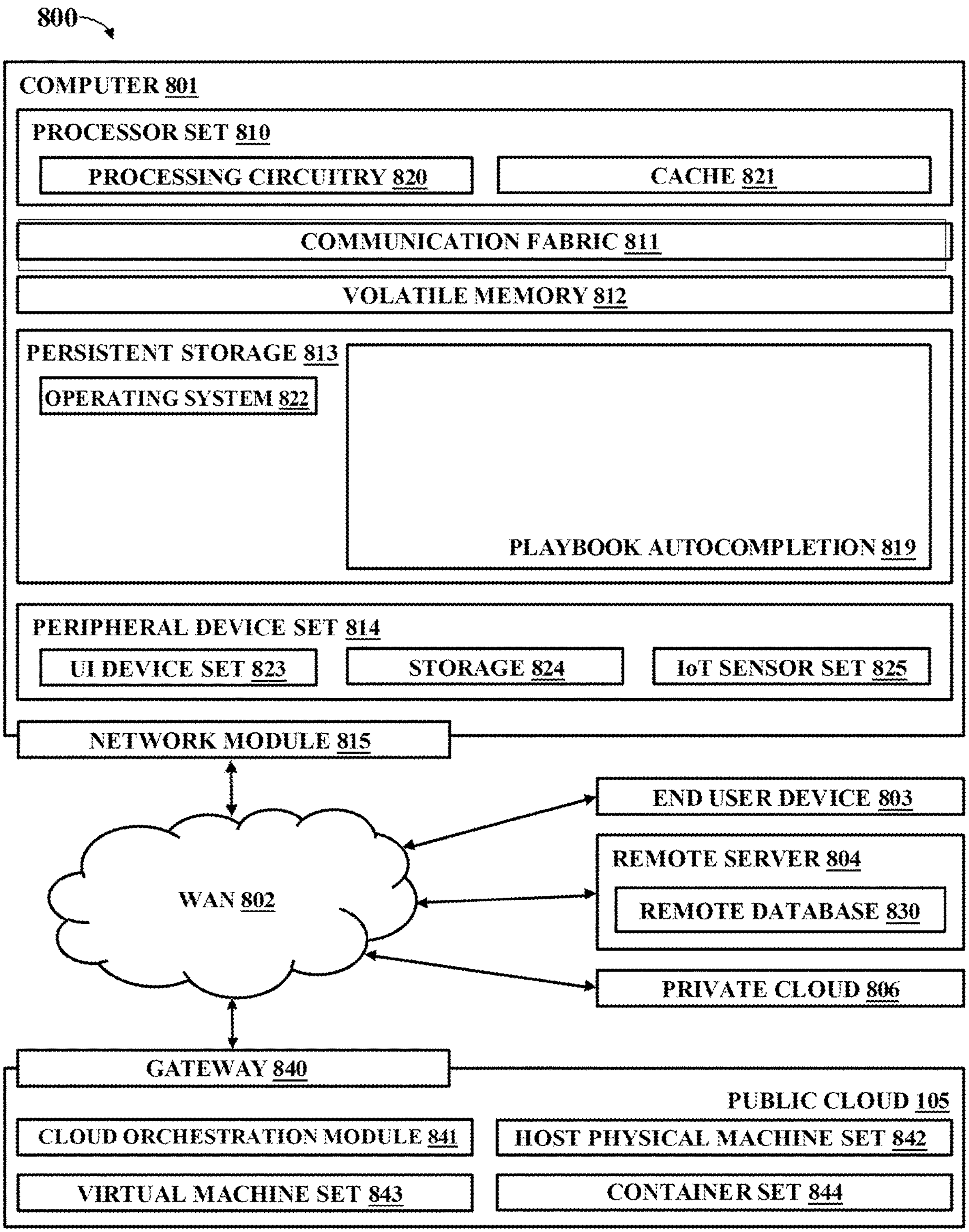
FIG. 8 is a block diagram of an exemplary computing environment that can perform playbook autocompletion, in accordance with an embodiment of the present invention.

Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 819 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 819 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices.

Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments.

Gateway 840 is the collection of computer software, hardware, and firmware that allows public cloud 805 to communicate through WAN 802. Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

Figure 9:
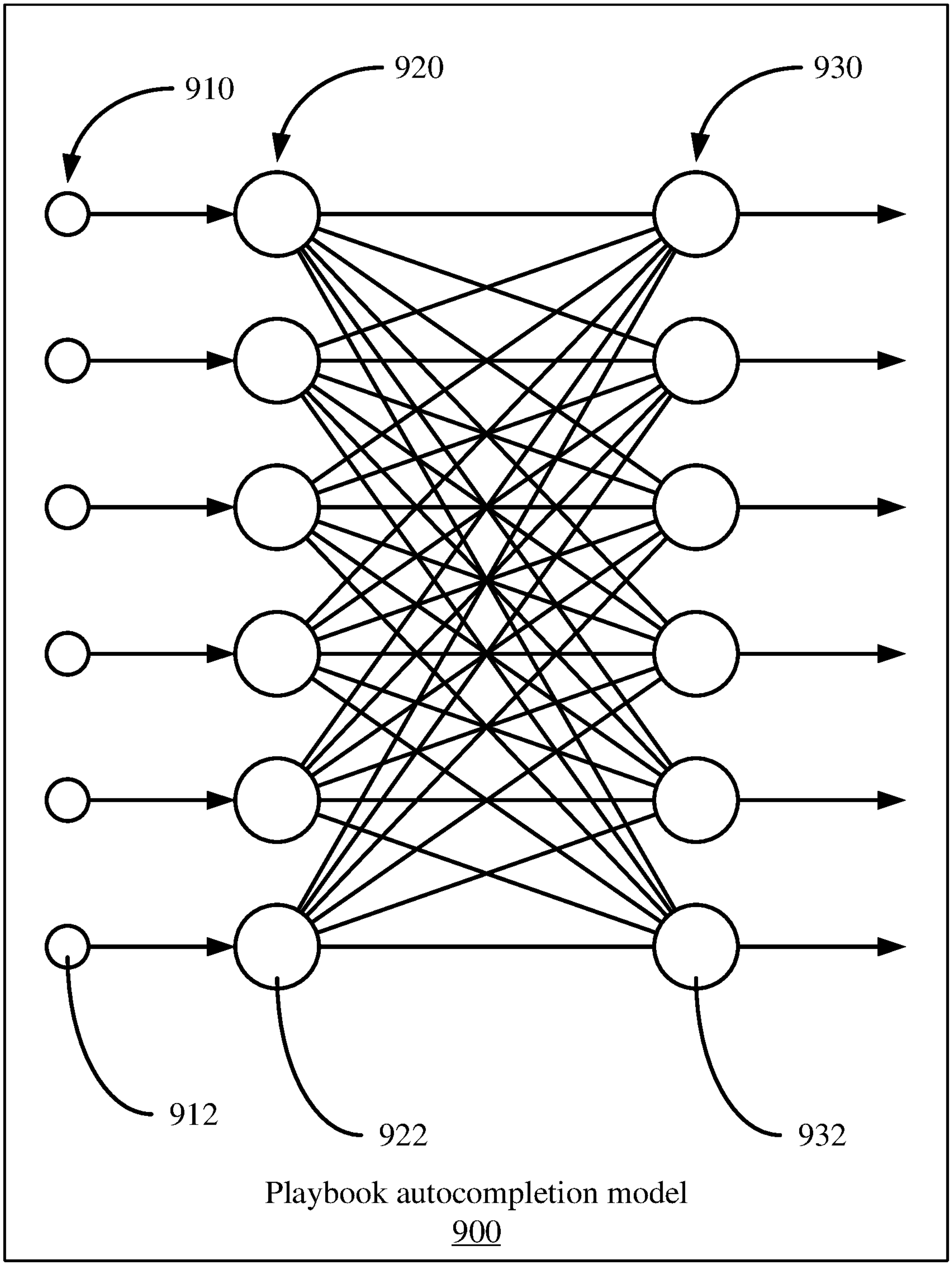
FIG. 9 is a diagram of an exemplary neural network architecture that can be used to implement part of a playbook autocompletion model, in accordance with an embodiment of the present invention.
Figure 10:
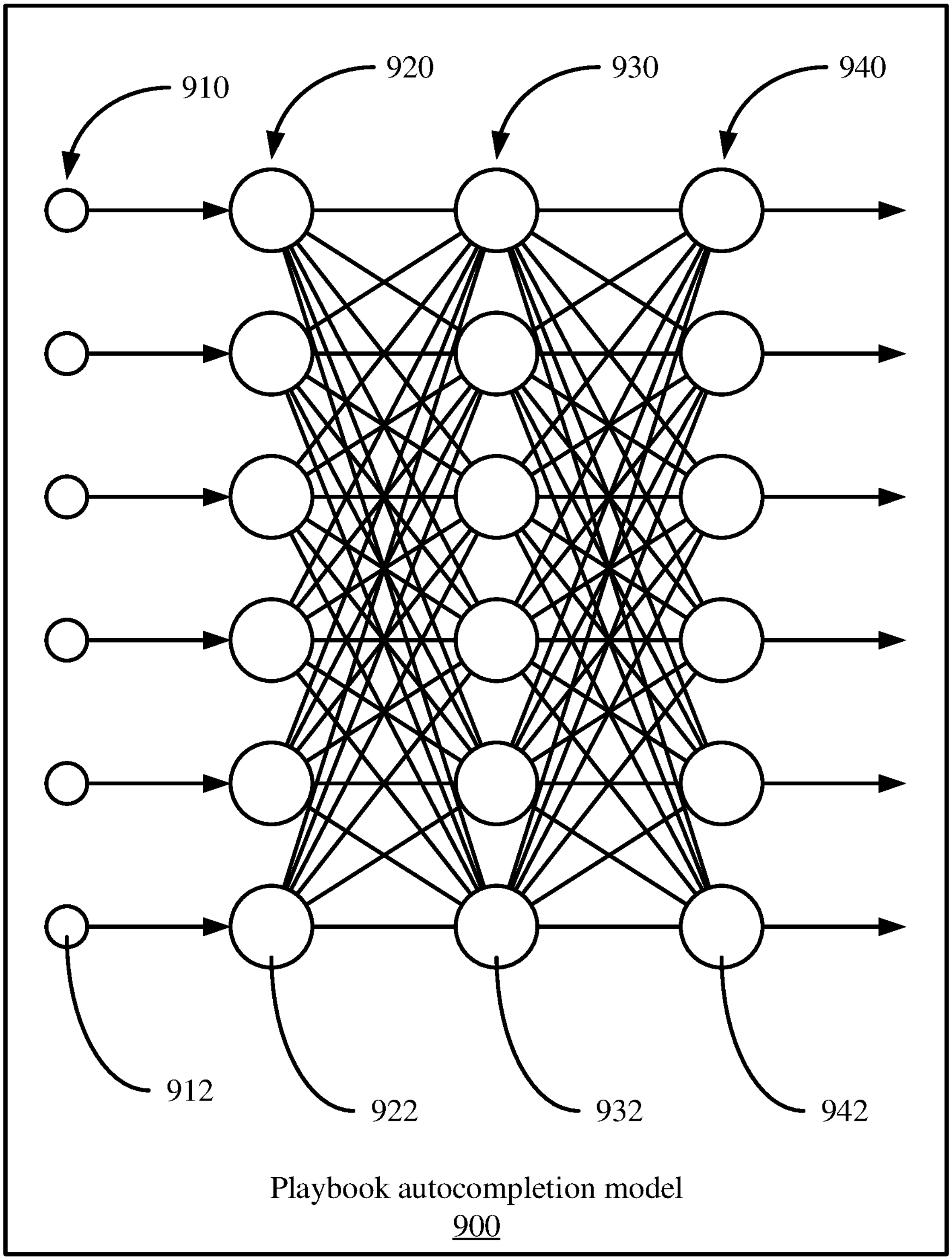
FIG. 10 is a diagram of an exemplary deep neural network architecture that can be used to implement part of a playbook autocompletion model, in accordance with an embodiment of the present invention.

Referring now to FIGS. 9 and 10, exemplary neural network architectures are shown, which may be used to implement parts of the present models, such as the playbook autocompletion model 900. A neural network is a generalized system that improves its functioning and accuracy through exposure to additional empirical data. The neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the input data belongs to each of the classes can be output.

The empirical data, also known as training data, from a set of examples can be formatted as a string of values and fed into the input of the neural network. Each example may be associated with a known result or output. Each example can be represented as a pair, (x, y), where x represents the input data and y represents the known output. The input data may include a variety of different data types, and may include multiple distinct values. The network can have one input node for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples, and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

In layered neural networks, nodes are arranged in the form of layers. An exemplary simple neural network has an input layer 920 of source nodes 922, and a single computation layer 930 having one or more computation nodes 932 that also act as output nodes, where there is a single computation node 932 for each possible category into which the input example could be classified. An input layer 920 can have a number of source nodes 922 equal to the number of data values 912 in the input data 910. The data values 912 in the input data 910 can be represented as a column vector. Each computation node 932 in the computation layer 930 generates a linear combination of weighted values from the input data 910 fed into input nodes 920, and applies a non-linear activation function that is differentiable to the sum. The exemplary simple neural network can perform classification on linearly separable examples (e.g., patterns).

A deep neural network, such as a multilayer perceptron, can have an input layer 920 of source nodes 922, one or more computation layer(s) 930 having one or more computation nodes 932, and an output layer 940, where there is a single output node 942 for each possible category into which the input example could be classified. An input layer 920 can have a number of source nodes 922 equal to the number of data values 912 in the input data 910. The computation nodes 932 in the computation layer(s) 930 can also be referred to as hidden layers, because they are between the source nodes 922 and output node(s) 942 and are not directly observed. Each node 932, 942 in a computation layer generates a linear combination of weighted values from the values output from the nodes in a previous layer, and applies a non-linear activation function that is differentiable over the range of the linear combination. The weights applied to the value from each previous node can be denoted, for example, by w1, w2, . . . wn−1, wn. The output layer provides the overall response of the network to the input data. A deep neural network can be fully connected, where each node in a computational layer is connected to all other nodes in the previous layer, or may have other configurations of connections between layers. If links between nodes are missing, the network is referred to as partially connected.

Training a deep neural network can involve two phases, a forward phase where the weights of each node are fixed and the input propagates through the network, and a backwards phase where an error value is propagated backwards through the network and weight values are updated.

The computation nodes 932 in the one or more computation (hidden) layer(s) 930 perform a nonlinear transformation on the input data 912 that generates a feature space. The classes or categories may be more easily separated in the feature space than in the original data space.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of playbook generation using controlled causal language modeling (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method of generating a playbook, comprising:
- parsing a prompt and playbook context to identify modules;
- adding names of the identified modules to the prompt to create a modified prompt;
- identifying a document relevant to the playbook context and the modified prompt based on a semantic search;
- determining a schema based on the document; and
- generating an automatic completion of the prompt in accordance with the schema using a trained model including enforcing constraints to control outputs during inference of the trained model with logit processors selected for respective fields in the schema.

2. The method of claim 1, wherein the identifying of the document includes searching a set of documentation for the identified modules.

3. The method of claim 2, wherein the document defines the schema to include a format for using a respective module of the identified modules in the playbook.

4. The method of claim 1, wherein the generating of the automatic completion is further performed in accordance with the constraints that are defined in the schema.

5. The method of claim 4, wherein the constraints are selected from the group consisting of a default constraint, a constraint of a value to a corresponding set, a constraint of a value to a particular type, and a required field.

6. The method of claim 1, wherein the playbook context includes a partially defined playbook and the prompt includes a description of a function to be implemented by the automatic completion.

7. The method of claim 1, wherein the identifying of the document is performed using an encoder-only transformer-based neural network model.

8. The method of claim 7, wherein the encoder-only transformer-based neural network model is trained on a dataset made up of triplets that each include a query, a positive passage, and a negative passage using a multiple negative ranking loss function.

9. The method of claim 1, wherein the generating of the automatic completion is performed using a decoder-only neural network model for causal language modeling.

10. The method of claim 9, wherein the decoder-only neural network model is trained on a dataset made up of pairs that each include a respective module name and a combination of a respective prompt and a respective playbook context.

11. A system for generating a playbook, comprising:

a hardware processor; and a memory that stores a computer program which, when executed by the hardware processor, causes the hardware processor to:

parse a prompt and playbook context to identify modules;

add names of the identified modules to the prompt to create a modified prompt;

identify a document relevant to the playbook context and the modified prompt based on a semantic search;

determine a schema based on the document; and generate an automatic completion of the prompt in accordance with the schema using a trained model including enforcing constraints to control outputs during inference of the trained model with logit processors selected for respective fields in the schema.

12. The system of claim 11, wherein the identification of the document includes searching a set of documentation for the identified modules.

13. The system of claim 12, wherein the document defines the schema to include a format for using a respective module of the identified in the playbook.

14. The system of claim 11, wherein the generation of the automatic completion is further performed in accordance with the constraints that are defined in the schema.

15. The system of claim 14, wherein the constraints are selected from the group consisting of a default constraint, a constraint of a value to a corresponding set, a constraint of a value to a particular type, and a required field.

16. The system of claim 11, wherein the playbook context includes a partially defined playbook and the prompt includes a description of a function to be implemented by the automatic completion.

17. The system of claim 11, wherein the identification of the document is performed using an encoder-only transformer-based neural network model.

18. The system of claim 17, wherein the encoder-only transformer-based neural network model is trained on a dataset made up of triplets that each include a query, a positive passage, and a negative passage using a multiple negative ranking loss function.

19. The system of claim 11, wherein the generation of the automatic completion is performed using a decoder-only neural network model for causal language modeling, trained on a dataset made up of pairs that each include a respective module name and a combination of a respective prompt and a respective playbook context.

20. A computer program product for generating a playbook, the computer program product comprising a computer readable storage medium having program instructions embodied therewith, the program instructions being executable by a hardware processor to cause the hardware processor to:

parse a prompt and playbook context to identify modules;

add names of the identified modules to the prompt to create a modified prompt;

identify a document relevant to the playbook context and the modified prompt based on a semantic search;

determine a schema based on the document; and generate an automatic completion of the prompt in accordance with the schema using a trained model including enforcing constraints to control outputs during inference of the trained model with logit processors selected for respective fields in the schema.

* * * * *